(No Model.)

L. P. SNYDER & G. WAIGLE.
TEA KETTLE.

No. 377,124. Patented Jan. 31, 1888.

Attest:
John Schuman.

Inventors:
Lewis P. Snyder,
and
George Waigle.
By Att'y
T. J. W. Roberton

United States Patent Office.

LEWIS P. SNYDER AND GEORGE WAIGLE, OF LINDEN, MICHIGAN.

TEA-KETTLE.

SPECIFICATION forming part of Letters Patent No. 377,124, dated January 31, 1888.

Application filed May 12, 1887. Serial No. 237,965. (No model.)

*To all whom it may concern:*

Be it known that we, LEWIS P. SNYDER and GEORGE WAIGLE, of Linden, in the county of Genesee and State of Michigan, have invented new and useful Improvements in Tea-Kettles; and we do hereby declare that the following is a full, clear, and exact description thereof, reference being had to the accompanying drawings, which form a part of this specification.

This invention relates to certain new and useful improvements in tea-kettles.

The object of the invention is to provide a cover for tea-kettles that will automatically close itself upon the handle being moved into a vertical position, and thus prevent the cover from falling off when pouring from the kettle and the liability of burning the hand from the escaping steam.

To this end the invention consists in the peculiar construction, arrangement, and combination of the parts, all as more fully hereinafter set forth.

Figure 1:
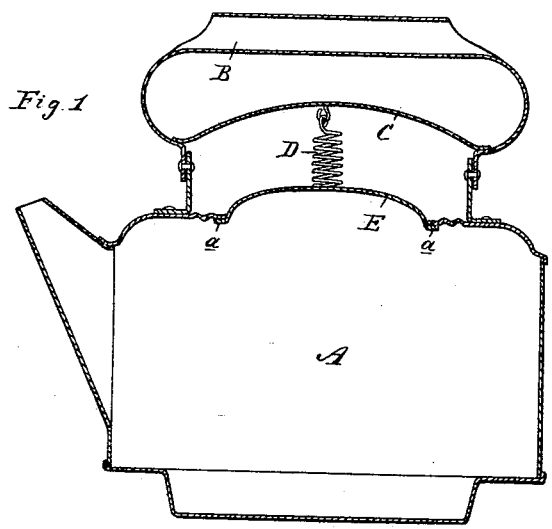
Figure 2:
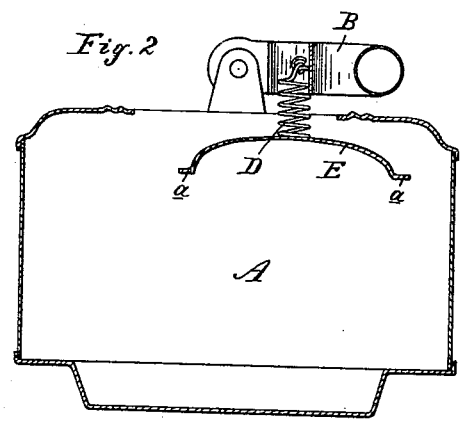

Figure 1 is a cross-section showing the kettle-opening closed. Fig. 2 is a similar view, at right angles, with the kettle-opening open.

In the accompanying drawings, which form a part of this specification, A represents a tea-kettle provided with the handle, and is of the usual construction.

To the handle B is secured the brace-bar or girt C, and pendent from this brace-bar is a coil-spring, D, the lower end of which is rigidly secured to the inner cover, E. This cover has no rim, but is provided with a flange, *a*, which is somewhat larger than the opening in the kettle-top. By this construction it will readily be seen that when the handle is in the position shown in Fig. 1 the action of the spring draws the cover up snugly against the kettle-top and keeps it closed while pouring. When the handle is turned to one side, the cover drops into position shown in Fig. 2.

What we claim as our invention is—

1. In combination with a tea-kettle and its handle, an internal cover and a spring connecting said handle and cover, substantially as and for the purposes specified.

2. In a tea-kettle, the combination, with the kettle A and handle provided with brace-bar C, of the flanged cover E, and the coil-spring D, connecting said cover and brace-bar, substantially as described.

LEWIS P. SNYDER.
GEORGE WAIGLE.

Witnesses:
JAMES B. MORHIN,
TRENT BOWLES.